United States Patent
Borg et al.

(10) Patent No.: US 7,059,458 B2
(45) Date of Patent: Jun. 13, 2006

(54) DEVICE FOR DAMPING THE DISPLACEMENT OF A PART, INVOLVING A METAL WIRE

(75) Inventors: Evrard Borg, Sanary (FR); Laurent D'Emmanuelle, Toulon (FR); Eric Laspesa, Six Fours (FR); Jean-Paul Nadeau, Ollioules (FR)

(73) Assignee: Pyroalliance, Les Mureaux (FR)

( * ) Notice: Subject to any disclaimer, the term of this patent is extended or adjusted under 35 U.S.C. 154(b) by 0 days.

(21) Appl. No.: 10/866,111

(22) Filed: Jun. 14, 2004

(65) Prior Publication Data

US 2005/0006191 A1 Jan. 13, 2005

(30) Foreign Application Priority Data

Jul. 10, 2003 (FR) .................................. 03 08477

(51) Int. Cl.
*F16F 7/12* (2006.01)

(52) U.S. Cl. .................... 188/371; 188/376; 267/139; 293/133; 293/118; 293/119; 280/777; 89/1.14

(58) Field of Classification Search ............... 188/371, 188/378, 380, 376, 65.1, 65.4, 274; 267/139; 89/1.14; 280/731, 753, 777; 293/133, 132, 293/107, 118, 119; 340/436
See application file for complete search history.

(56) References Cited

U.S. PATENT DOCUMENTS

| 4,091,621 | A | * | 5/1978 | Patrichi ...................... 60/635 |
| 5,303,631 | A | | 4/1994 | Frehaut et al. |
| 5,364,129 | A | * | 11/1994 | Collins et al. ............... 280/806 |
| 5,695,242 | A | * | 12/1997 | Brantman et al. ........ 297/216.1 |
| 6,227,583 | B1 | * | 5/2001 | Eipper et al. ................ 293/133 |
| 6,329,910 | B1 | * | 12/2001 | Farrington ................... 340/436 |
| 6,334,639 | B1 | * | 1/2002 | Vives et al. ................. 293/133 |
| 6,367,840 | B1 | | 4/2002 | Duval et al. |
| 6,419,177 | B1 | * | 7/2002 | Stevens ....................... 242/374 |
| 6,530,596 | B1 | * | 3/2003 | Sinnhuber .................... 280/731 |
| 6,568,184 | B1 | * | 5/2003 | Blackburn et al. ............. 60/636 |
| 6,752,423 | B1 | * | 6/2004 | Borde et al. ................. 280/753 |
| 6,851,715 | B1 | * | 2/2005 | Devereaux et al. ......... 280/806 |
| 2004/0031259 | A1 | * | 2/2004 | Baricos et al. ................ 60/224 |

FOREIGN PATENT DOCUMENTS

| EP | 0 894 677 A1 | 2/1999 |
| FR | 2 805 323 | 8/2001 |
| GB | 2379 194 A | 3/2003 |

* cited by examiner

Primary Examiner—James McClellan
Assistant Examiner—Mariano Sy
(74) Attorney, Agent, or Firm—Oliff & Berridge PLC

(57) ABSTRACT

A damping device used for motor vehicle safety, for damping the displacement of at least one part set in motion during a collision between a motor vehicle and an external object, the part being, for example, a bumper, a steering column or a bonnet of a motor vehicle, the device comprising an actuator that is able to displace a piston and is characterized in that it includes a wire having one end connected to a fixed portion of the vehicle, the actuator, which is secured to the part to be damped, interacting with the wire in order to retard and then stop the part.

18 Claims, 4 Drawing Sheets

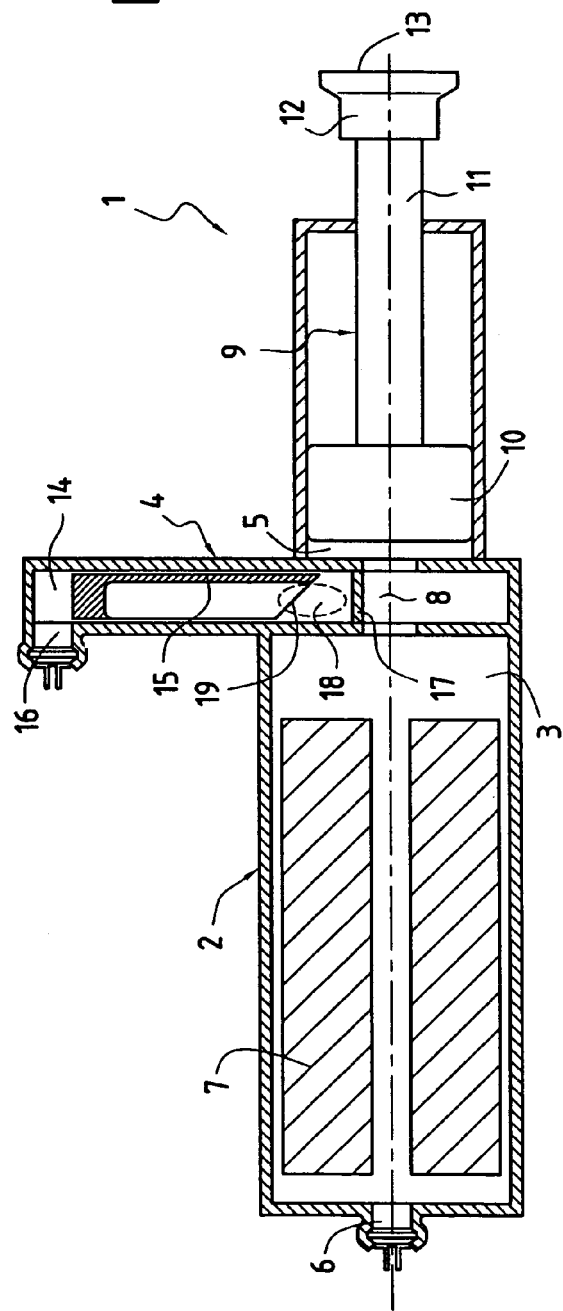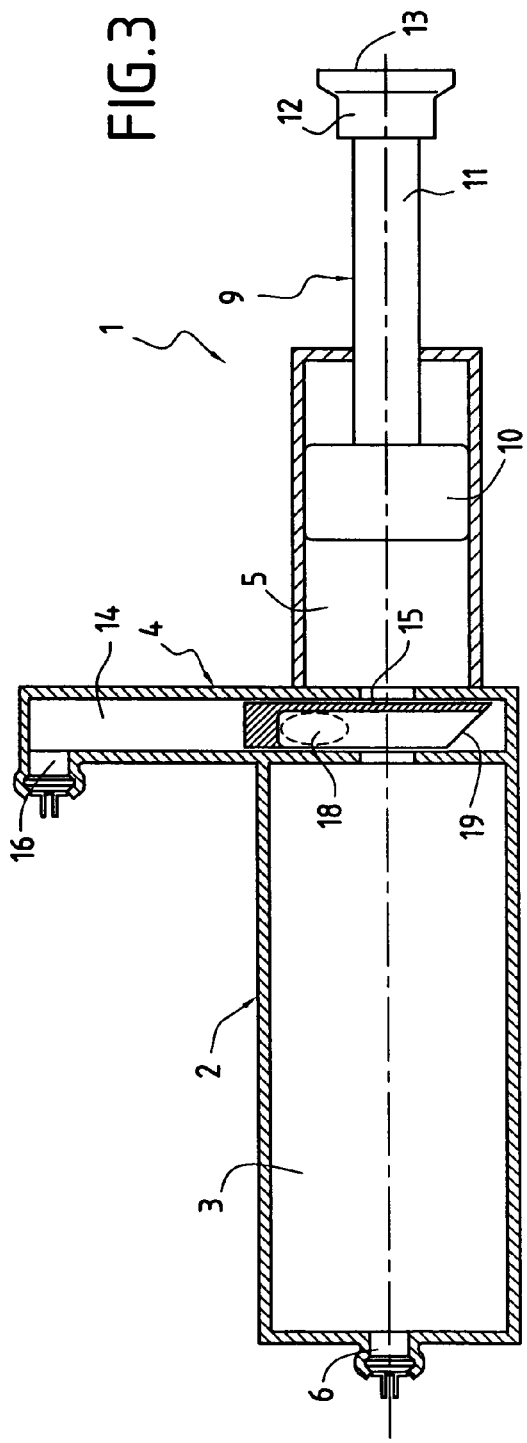

DEVICE FOR DAMPING THE DISPLACEMENT OF A PART, INVOLVING A METAL WIRE

CROSS-REFERENCE TO RELATED APPLICATIONS

This application claims priority from French Application No. 0308477, filed Jul. 10, 2003, the entire disclosure of which is incorporated herein by reference thereto.

BACKGROUND

The technical field of the invention is that of motor safety and more especially that of safety systems employed in motor vehicles for damping the displacement of certain parts which have been set in motion during a mechanical collision between the motor vehicle and an external object. In fact, during an impact, certain parts of a motor vehicle can constitute a fixed stop for an occupant of a motor vehicle or a pedestrian and thus be liable to injure the occupant or the pedestrian.

Energy absorption devices have already formed the subject of several patent applications.

For example, mention may be made of Patent Application EP 0 550 321, which relates to a pyrotechnic actuator with damped travel that can be used in any type of energy absorption system. This actuator comprises a pyrotechnic gas generator, a piston, a combustion chamber for pyrotechnic substances and a back-pressure chamber, and also an intermediate chamber included between the combustion chamber and one end of the piston. A channel connects the intermediate chamber to the back-pressure chamber. The gas emitted by the generator pressurizes the intermediate chamber in order to oppose the movement of the piston and thus damp its travel, some of the gas being conveyed through the channel towards the back-pressure chamber.

SUMMARY

In absorption systems using an actuator with damped travel as described above, damping is obtained directly and solely through the combustion gas. To obtain a response that is perfectly tailored to the impact that has occurred, it will therefore be necessary to use an adjustable pyrotechnic gas generator. This greatly complicates the structure of such an absorption system and also increases its manufacturing costs. Furthermore, installing such a system will often require adapting the parts on which it is installed.

An object is therefore to obtain a damping device that is simple, easy to employ and to install and requires only a limited number of parts, a factor which will make it possible, in particular, to provide the device with high operational reliability.

This object can be achieved by a damping device for damping the displacement of at least one part set in motion during a mechanical collision between a motor vehicle and an external object, the device comprising a pyrotechnic actuator that is able to displace a piston and being characterized in that it includes a wire having one end connected to a fixed portion of the vehicle, the actuator, which is secured to the part to be damped, interacting with the wire in order to retard and then stop the part.

Accordingly, the part may consist, for example, of a bumper of a motor vehicle, of a seatbelt, of the bonnet of a motor vehicle or of a steering column of a motor vehicle against which the driver is pressed during the impact.

The notion of damping of the part can be likened to the part being retarded and then stopped. This damping is produced by means of an interaction between the two elements formed by the wire and the actuator, which appear as indissociable from one another to perform this function.

Advantageously, the wire has one free end and possesses the ability to be deformed. In this way, the wire has one free end and one end 10 connected to a fixed portion of the vehicle. And, preferably, the wire is made of metal.

Advantageously, the actuator is fastened to a support 15 connected to the part to be damped, the support comprising two stops for guiding the wire.

Preferably, the guide stops consist of two rollers each having a groove, the wire passing within each of the two grooves. This type of configuration limits any lateral displacement of the wire.

Advantageously, the two stops are placed on the same side of the wire and, when actuated, the actuator exerts a thrust on the wire between the two stops so as to imprint three successive folds on the wire. The first fold is situated around the first stop, the second round the piston and the third round the second stop.

In this configuration, the displacement of the support along the wire becomes difficult or even impossible because of the sinuous path taken by the wire due to the piston being driven in, the driving action generating forces which will oppose the displacement.

According to one preferred embodiment of the invention, the piston is displaced in a direction perpendicular to the imaginary straight line connecting the centres of each of the two stops.

Preferably, the support is initially connected to a 5 fixed portion of the vehicle via a weakened zone.

According to one preferred embodiment of the invention, the actuator is an actuator with a variable thrust action.

Preferably, the actuator is of the pyrotechnic type and comprises a pyrotechnic gas generator, a combustion chamber and a sliding chamber in which the piston is able to be displaced under the effect of the gas.

Advantageously, the actuator comprises a blocking device employed after the actuator has been triggered in order, on the one hand, to close the sliding chamber and, on the other hand, to depressurize the combustion chamber.

In fact, the amplitude of piston displacement in the sliding chamber is related to the pressure level reached in the chamber. The closure of the sliding chamber is brought about when the piston has reached a specified position through which the necessary damping may be obtained. Once the closure has taken place, the gas then freely accumulates in the combustion chamber with a not inconsiderable risk of bursting. It is therefore necessary to depressurize the combustion chamber as swiftly as possible after the sliding chamber has been blocked off.

Preferably, the blocking device comprises a motor and a slide part that is able to be displaced, under the effect of the motor, in a sliding enclosure provided with a vent, the enclosure and the combustion chamber being isolated from one another by a screen of material.

In this way, the sliding enclosure and the combustion chamber do not communicate with one another and the enclosure constitutes a space that is open to the outside by way of the vent.

Advantageously, the slide part is hollow and has a cutting end, with the result that the displacement of the part in the sliding enclosure first leads to the screen of material being ruptured and then, simultaneously, to the sliding chamber for the piston being blocked off and the combustion chamber being placed in communication with the enclosure.

To be more precise, the cutting end comes into contact with the screen of material and then cuts through it, while the hollow portion of the slide part assumes the function of a duct allowing passage between the combustion chamber and the sliding enclosure. The sliding chamber is blocked off via a portion of the lateral wall of the slide part.

Preferably, the actuator comprises a non-return device preventing the return movement of the piston towards the inside of the sliding chamber.

During the closure of the sliding chamber, some of the gas present in the chamber may escape through the vents, thus causing a pressure drop in the chamber and therefore a reduction in the thrust force exerted by the piston on the wire, or even a retraction of the piston. The presence of this non-return device may therefore prove necessary to maintain the piston in a fixed position and thus avoid these dysfunctions. According to the invention, once the piston has reached the desired position under the pressure of the gas that has accumulated in the sliding chamber and by virtue of the non-return device, the piston is no longer able to retract and remains in fixed contact with the wire.

Advantageously, the motor of the blocking device is a pyrotechnic gas generator.

According to another embodiment of the invention, the gas generator of the actuator comprises a plurality of pyrotechnic charges which can be ignited independently of one another in such a way as to supply a variable quantity of gas. The charges may be triggered on the basis of a predetermined sequential ignition. Only some of the charges may be involved in the combustion. Finally, the charges may have characteristics that differ from one another within one and the same gas generator.

The exemplary damping devices have the advantage of having high precision by making use of two pyrotechnic gas generators whose ignition sequence, which may be programmed, is perfectly controlled, particularly because of a high degree of reliability at their ignition level and the very low reaction times of the generators. They also have the advantage of a small space requirement because of the small number of parts involved. Finally, the simplicity of their operating mechanism gives them a high level of reliability.

The absorption system described may therefore be used, for example, for damping a bumper of a motor vehicle in the event of a low-speed head-on collision of the vehicle, for damping the lower limbs of an occupant of a motor vehicle, for damping the movement of a bonnet of a motor vehicle caused by the impact of a pedestrian against the bonnet, for adjustably limiting the force exerted by an occupant of a motor vehicle on his seatbelt during an impact, or for damping the impact of a driver against a steering column.

BRIEF DESCRIPTION OF THE DRAWINGS

A detailed description of a preferred embodiment of the invention will be given below with reference to the figures in which:

FIG. 2 is a view in longitudinal axial section of a pyrotechnic actuator with variable thrust effect that has not yet operated;

FIG. 3 represents the actuator of FIG. 2, but after it has operated;

DETAILED DESCRIPTION OF EMBODIMENT

Figure 1:
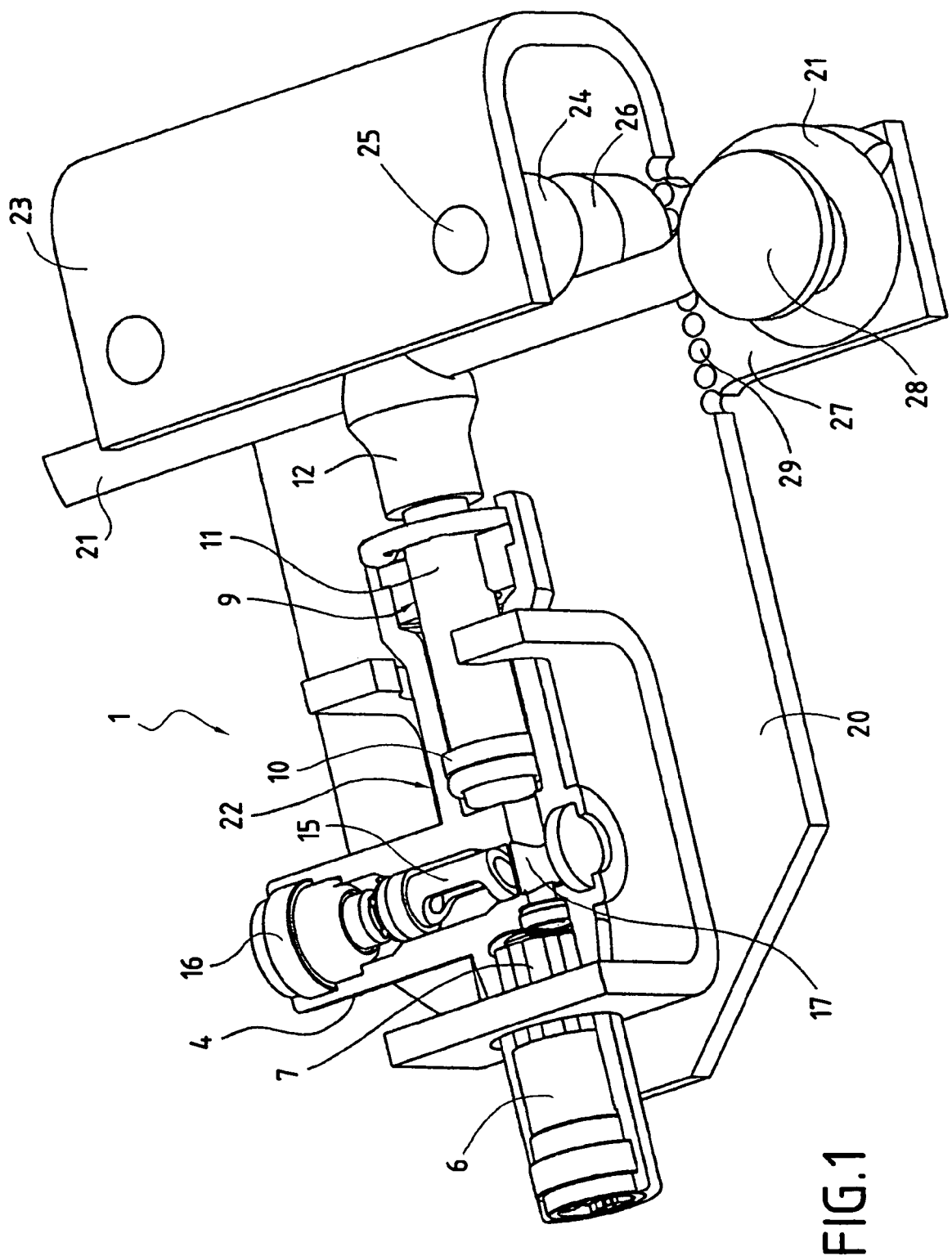
FIG. 1 is a perspective view of a damping device, its pyrotechnic actuator with variable thrust effect being presented without its upper part.

With reference to FIG. 1, a damping device 1 makes use of a support 20 secured to a part to be damped in a motor vehicle following a collision, a metal wire 21 and a pyrotechnic actuator 22 with variable thrust action, the actuator 22 being fastened to the support 20.

The part to be damped can, for example, be a bonnet of a motor vehicle. In this case, the damping device will be placed under the bonnet and will make it possible, for example, to damp the movement of the bonnet during the impact of a pedestrian against the bonnet. In this case, when the motor vehicle strikes a pedestrian head-on, the bonnet of the vehicle is raised by a certain height as it pivots about an axis of rotation situated towards the front of the vehicle. Generally, the pedestrian is tipped over and strikes the bonnet of the vehicle. The absorption system according to the invention, placed under the bonnet, makes it possible to damp the movement of the bonnet caused by the impact of the pedestrian against the bonnet.

The part to be damped may also be a bumper of a motor vehicle. The device may be placed, for example, between the bumper of a motor vehicle and the bumper-carrying structure in order to damp the movement of the bumper in the event of a head-on collision of the vehicle. During the accident, the bumper advances by virtue of a specific device, for example one fitted with pyrotechnic actuators, and is then damped by the absorption system. When the collision occurs at low speed, this will particularly allow deformation of the chassis of the vehicle to be prevented and thus reduce the cost of repairing the vehicle after the accident.

The part to be damped may also be, for example, a steering column. In this case, it will be required to damp the displacement of the column produced by the impact of the driver against the said column.

The part to be damped may also, for example, be a seatbelt. In this case, it will be required to retard and to stop the seatbelt in order to prevent the occupant of the vehicle being retained too forcefully by his seatbelt during an accident.

The support 20 has a folded 25 portion 23 in which two rollers 24 are fastened by way of a fastening pin 25, one of the two rollers 24 not being visible in FIG. 1. The two rollers 24 are placed on the same plane and each comprise a groove 26 within which the metal wire 21 passes. One of the two 30 ends of the wire 21 is connected, for example, to a fixed portion 27 of the vehicle, being wound around a lug 28 of the fixed portion 27, the other end of the wire 21 is free. According to the invention, it is quite possible to consider the reverse 35 and the arrangement of the device according to the invention will depend on the applications in which it is used. Depending on the applications considered, the support 20 is connected to the fixed portion 27 of the vehicle optionally by way of a weakened zone 29 that is able to be cut off easily in the event of a collision of the vehicle.

With reference to FIG. 2, the pyrotechnic actuator 22 consists of a hollow body 2 delimiting three separate portions in the continuity of one another: a combustion chamber 3 extended by a blocking device 4, itself extended by a sliding chamber 5. The combustion chamber 3, which is cylindrical, has an electropyrotechnic ignition system 6 at one of its ends and houses a pyrotechnic gas generator 7. The other end of the chamber 3 has an opening that leads, via a passage 8, into the sliding chamber 5, which also has a cylindrical shape and in which is housed a piston 9 comprising a cylindrical body 10 extended by a central rod 11 of small diameter. The body 10 of the piston 9 has a diameter that is slightly smaller than the diameter of the inner wall of the sliding chamber 5, with the result that the piston 9 is able to slide in a sealed manner in the chamber 5.

Preferably, the actuator comprises a non-return device preventing the movement of the piston 9 towards the inside of the sliding chamber. Once the piston 9 has reached a specified position under the pressure of the gas present in the sliding chamber 5, by virtue of the non-return device it is no longer able to slide in the reverse direction, that is to say towards the inside of the sliding chamber 5.

Figure 5A:
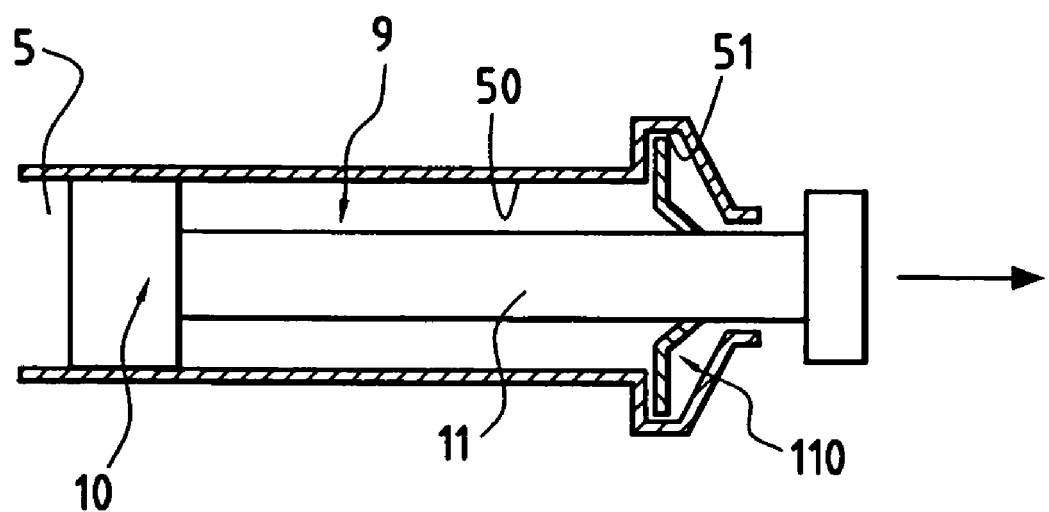
FIGS. 5A and 5B represent two separate embodiments of a non-return device fitted to the actuator to prevent the piston from moving in the reverse direction.
Figure 5B:
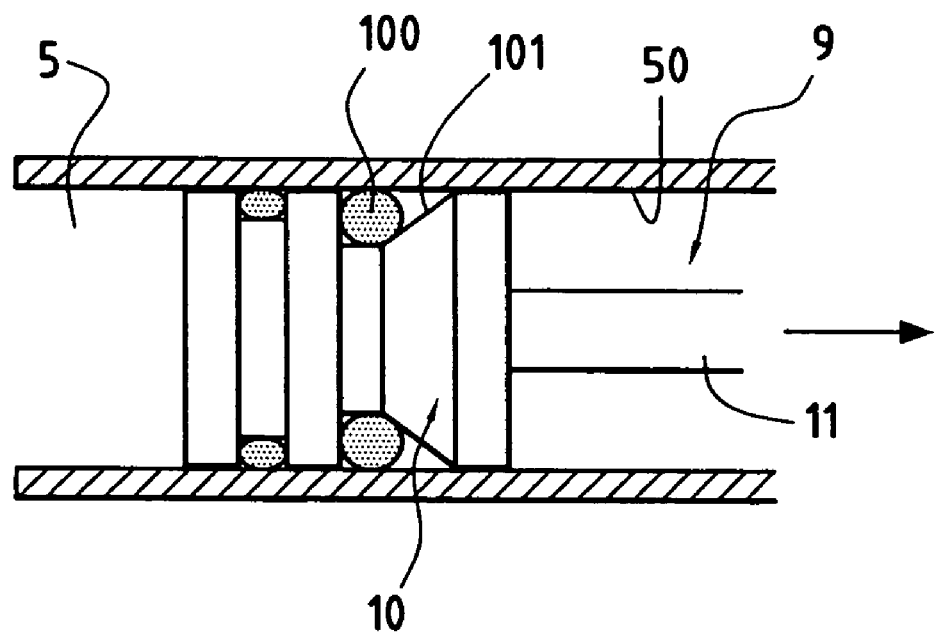

With reference to FIG. 5B, the non-return device may consist, for example, of balls 100 housed in a portion of the piston 9. During a return of the piston 9 towards the inside of the sliding chamber, the balls 100 follow a frustoconical profile 101 formed on the lateral wall of the piston 9 and thus come into contact with the inner wall 50 of the cylinder delimiting the sliding chamber 5 of the piston 9. The balls 100 thus make it possible to stop the piston 9 in the specified position by the pressure of the gas present in the sliding chamber 5. According to an alternative embodiment represented in FIG. 5A, the non-return device consists of a notched washer 110 that is slipped around the rod 11 of the piston 9 and housed in an annular groove 51 formed in the inner wall 50 of the cylinder delimiting the sliding chamber 5 of the piston 9. The washer 110 has a shape that is convergent in the thrust direction of the piston 9. The diameter of the central orifice of the washer is determined in such a way that the washer 110 is in contact with the rod 11 of the piston 9. When the piston is displaced in the direction of the arrow in FIG. 5A to exert a thrust, the rod 11 slides relative to the washer 110 and is thus released from the actuator. During a movement in the opposite direction, the washer 110, held in place in the groove 51, is urged inwards and, by virtue of its convergence, stops the piston 9 from returning towards the inside of the sliding chamber 5.

The sliding chamber 5 has an opening at one of its ends, from which opening emerges the free end of the central rod 11 of the piston 9, the free end being covered by a cap 12 having two raised parallel edges. The axis of revolution of the combustion chamber 3 is coincident with the axis of revolution of the sliding chamber 5. The passage 8 connecting the combustion chamber 3 to the sliding chamber 5 is partially delimited by the blocking device 4 having the shape of a hollow cylinder in which a slide part 15 is housed.

The blocking device 4 has an elbow making it possible to define two rectilinear portions that are perpendicular to one another. The first portion comprises at its free end a secondary electropyrotechnic ignition system 16, and the second portion, which comprises the slide part 15, defines a sliding enclosure 14 for the slide part 15. The said enclosure 14 is separated from the passage 8 via a screen of material 17 and has a vent 18 opening to the outside of the actuator 1. The enclosure 14 therefore defines an open space separated both from the combustion chamber 3 and from the sliding chamber 5 for the piston 9. The slide part 15 consists of a hollow cylindrical part having an opening in the lateral wall and comprising a bevelled, cutting, open end 19. The slide part 15 is placed in the sliding enclosure 14 so that its cutting end is situated facing the screen of material 17. The axis of the sliding chamber is perpendicular to the axis of the combustion chamber 3 and to the axis of the sliding chamber 5.

At rest, as shown in FIG. 1, the cap 12 situated at the free end of the rod 11 of the piston 9 is in contact with the wire 21 between the two rollers 24, the wire 21 passing between the two raised edges of the cap 12.

The mode of operation of a damping device according to the invention follows the steps below. Firstly, subsequent to a collision of the vehicle, the damping device is subject to a predetermined setting phase. During this phase, the pyrotechnic actuator 22 is triggered. In other words, combustion is initiated in the gas generator 7, releasing gas that pervades the sliding chamber 5 and causes displacement of the piston 9. At a given instant, which may be predetermined, the blocking device 4 is ignited in turn.

Figure 4:
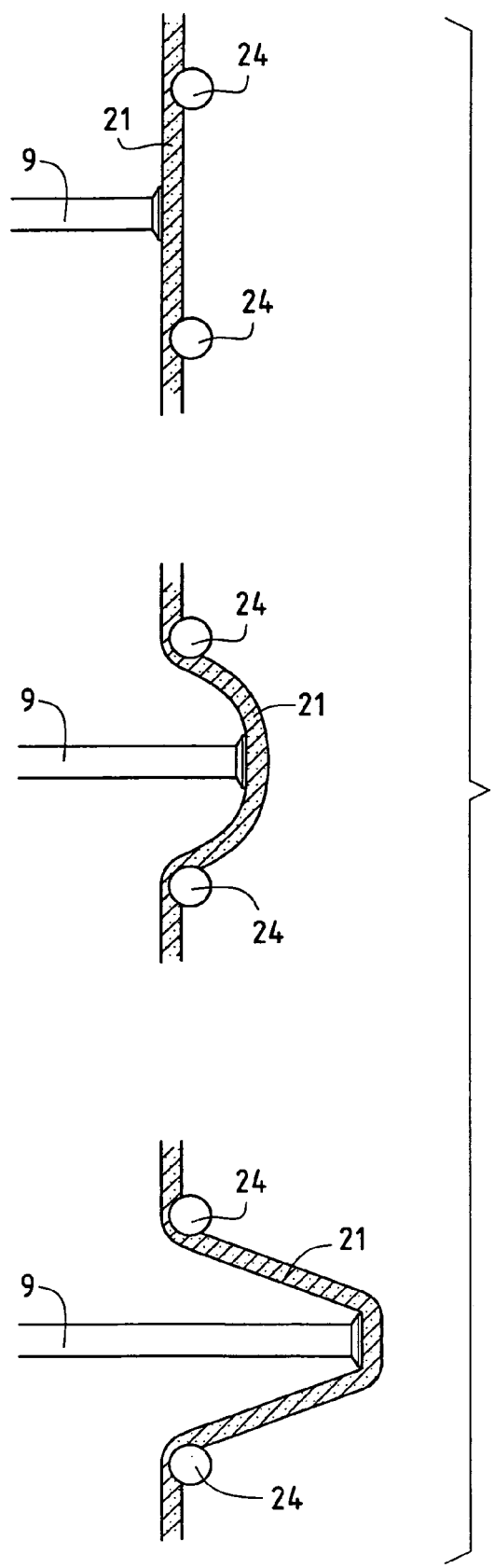
FIG. 4 represents a series of three simplified diagrams of a damping device shown at different stages of its operation.

The slide part 15 is then displaced in the sliding enclosure 14, causing the closure of the sliding chamber 5 while allowing gas from the combustion chamber 3 to escape via the vent 18, the part 15 having perforated the screen of material 17 beforehand. 35 In this way, the piston 9 is displaced by a predetermined length. By virtue of the non-return device, the piston is maintained in this position. Because the piston 9 is initially in contact with the wire 21, it then exerts a thrust on the wire, causing three successive folds to be formed on the wire, as shown in the third diagram of FIG. 4. This configuration represents the end of the setting phase.

Secondly, once the damping device has been set, the collision causes the weakened zone 29 to rupture, making it possible for the support 20, and therefore for the part to be damped, to be displaced relative to the fixed portion 27 of the vehicle, along the wire 21. The sinuous path taken by the wire 21, due to the piston 9 being driven in between the two rollers 24, generates forces during the displacement of the support 20 that will oppose the displacement along the wire 21. Consequently, the support 20, and therefore the part to be damped, are immediately retarded and then stopped.

Such a damping device may be adapted to damp a front bumper of a motor vehicle 20 during a head-on collision of the vehicle. Likewise, the damping device may be adapted to damp the movement of a bonnet of a motor vehicle caused by the impact of a pedestrian against the bonnet. In this 25 case, the support 20 is secured to the bonnet and the wire 21 is fastened to a fixed portion 27 of the vehicle. When a vehicle strikes a pedestrian frontally, the bonnet is raised and pivots about an axis situated near the front of the vehicle. The impact of the 30 pedestrian against the bonnet must be damped in order to prevent the bonnet constituting a fixed stop that is able to cause serious injuries to the pedestrian. Damping of the bonnet is necessary and may be achieved using a device in accordance with that of the 35 invention. Once the setting phase of the device has been implemented, the impact of the pedestrian against the bonnet causes the weakened zone 29 to rupture, making it possible for the support 20, and therefore the bonnet, to be displaced relative to the fixed portion 27 of the vehicle, along the wire 21. The sinuous path taken by the wire 21, due to the piston 9 being driven in between the two rollers 24, generates forces during the displacement of the support 20 that will oppose the displacement along the wire 21. Consequently, the support 20, and therefore the bonnet, are immediately retarded and then stopped.

The device according to the invention may also be adapted to retard and then stop the movement of a steering column of a motor vehicle, generated by the impact of the driver against the steering wheel. In this case, the support 20 is secured to the steering column and one end of the wire 21 is fastened to a fixed portion 27 of the vehicle. Once the damping device has been set, the impact causes the weakened zone 29 to rupture, thus allowing the support secured to the column to slide along the wire 21. Damping is then carried out along the wire 21 at the rate at which the piston 9 is driven against the wire 21 between the two rollers 24.

The invention claimed is:

1. A damping device for damping displacement of at least one part set in motion during a mechanical collision between a motor vehicle and an external object, comprising:
    an actuator;
    a piston displaced by the actuator; and
    a wire having one end connected to a fixed portion of the vehicle, wherein the actuator, which is secured to the part to be damped, interacts with the wire in order to retard and then stop the part, and the actuator is fastened to a support connected to the part to be damped, the support having two stops for guiding the wire and the support being connected to a fixed portion of the vehicle via a weakened zone.

2. The damping device according to claim 1, wherein the wire has one free end and possesses the ability to be deformed.

3. The damping device according to claim 2, wherein the wire is made of metal.

4. The damping device according to claim 1, wherein the guide stops consist of two rollers each having a groove, the wire passing within each of the two grooves.

5. The damping device according to claim 4, wherein the two stops are placed on the same side of the wire, and in that, when actuated, the piston of the actuator exerts a thrust on the wire between the two stops so as to imprint three successive folds on the wire.

6. The damping device according to claim 5, wherein the piston is displaced in a direction perpendicular to the imaginary straight line connecting the centres of each of the two stops.

7. The damping device according to claim 1, wherein the actuator is an actuator with a variable thrust action.

8. The damping device according to claim 7, wherein the actuator comprises a pyrotechnic gas generator, a combustion chamber and a sliding chamber in which the piston is able to be displaced under the effect of gas generated by the pyrotechnic gas generator.

9. The damping device according to claim 8, wherein the actuator comprises a blocking device employed after the actuator has been triggered in order to close the sliding chamber and, then to depressurize the combustion chamber.

10. The damping device according to claim 9, wherein the blocking device comprises a motor and a slide part that is able to be displaced, under the effect of the motor, in a sliding enclosure provided with a vent, the sliding enclosure and the combustion chamber being isolated from one another by a screen of material.

11. The damping device according to claim 10, wherein the slide part is hollow and has a cutting end, with the result that the displacement of the slide part in the sliding enclosure first leads to the screen of material being ruptured and then, substantially simultaneously, to the sliding chamber for the piston being blocked off and the combustion chamber being placed in communication with the sliding enclosure.

12. The damping device according to claim 8, wherein the actuator comprises a non-return device preventing the return of the piston towards the inside of the sliding chamber.

13. The damping device according to claim 10, wherein the motor of the blocking device is a pyrotechnic gas generator.

14. The damping device according to claim 7, wherein the gas generator of the actuator comprises a plurality of pyrotechnic charges which can be ignited independently of one another in such a way as to supply a variable quantity of gas.

15. Use of the damping device according to claim 1 for damping a bumper of the motor vehicle in the event of a head-on collision of the vehicle.

16. Use of the damping device according to claim 1, for protecting lower limbs of an occupant of the motor vehicle.

17. Use of the damping device according to claim 1, for damping the impact of a pedestrian against a bonnet of the motor vehicle.

18. Use of the damping device according to claim 1, for damping a steering column of the motor vehicle.

* * * * *